(12) United States Patent
Simpson et al.

(10) Patent No.: US 7,424,509 B2
(45) Date of Patent: Sep. 9, 2008

(54) SYSTEM AND METHOD FOR PRINTING FROM A WEB APPLICATION

(75) Inventors: Shell S. Simpson, Boise, ID (US); Ward S. Foster, Boise, ID (US); Kris R. Livingston, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 948 days.

(21) Appl. No.: 09/874,184

(22) Filed: Jun. 4, 2001

(65) Prior Publication Data

US 2002/0184305 A1 Dec. 5, 2002

(51) Int. Cl.
*G06F 15/16* (2006.01)

(52) U.S. Cl. .................. 709/203; 709/201; 709/224; 358/1.15

(58) Field of Classification Search ............... 709/201, 709/203, 224; 358/1.15; 715/513, 527, 713
See application file for complete search history.

(56) References Cited

U.S. PATENT DOCUMENTS

| | | | | |
|---|---|---|---|---|
| 6,005,678 A * | 12/1999 | Higashida et al. | ............ | 358/452 |
| 6,035,323 A * | 3/2000 | Narayen et al. | ............ | 709/201 |
| 6,144,997 A | 11/2000 | Lamming et al. | ............ | 709/217 |
| 6,166,826 A * | 12/2000 | Yokoyama | ................ | 358/1.16 |
| 6,320,671 B1 * | 11/2001 | Kelley et al. | ............... | 358/1.18 |
| 6,366,915 B1 * | 4/2002 | Rubert et al. | ................... | 707/10 |
| 6,449,639 B1 * | 9/2002 | Blumberg | .................... | 709/217 |
| 6,510,461 B1 * | 1/2003 | Nielsen | ...................... | 709/224 |
| 6,567,122 B1 * | 5/2003 | Anderson et al. | ......... | 348/211.3 |
| 6,623,527 B1 * | 9/2003 | Hamzy | ....................... | 715/513 |
| 6,636,259 B1 * | 10/2003 | Anderson et al. | ......... | 348/211.3 |
| 6,678,068 B1 * | 1/2004 | Richter et al. | ............... | 358/1.15 |
| 6,985,243 B1 * | 1/2006 | Matsueda | ................... | 358/1.15 |
| 7,117,519 B1 * | 10/2006 | Anderson et al. | ............ | 725/105 |
| 7,257,777 B1 * | 8/2007 | Kanevsky et al. | ........... | 715/794 |
| 2002/0033967 A1 * | 3/2002 | Liu | ............................. | 358/402 |
| 2002/0036793 A1 * | 3/2002 | Roosen et al. | ............. | 358/1.15 |
| 2002/0174206 A1 * | 11/2002 | Moyer et al. | ................ | 709/221 |
| 2002/0181010 A1 * | 12/2002 | Pineau | ....................... | 358/1.15 |
| 2003/0140315 A1 * | 7/2003 | Blumberg et al. | ............ | 715/527 |

FOREIGN PATENT DOCUMENTS

JP 2000112691 A * 4/2000

OTHER PUBLICATIONS

Rahgozar et al., "Internet Printing", SPIE, Publications, 1997, Abstract.*

* cited by examiner

*Primary Examiner*—Oanh Duong

(57) ABSTRACT

A system for printing target data from a web application used through a browser of a client computer that is operatively connected to a web server providing the web application. The system includes a client computer having a browser for using the web application, a web server for providing the web application, a web application content for providing the web application on the browser, and a print destination server specified by the user for printing the target data. The web application content further directs the browser to the print destination server responsive to user print selection.

25 Claims, 6 Drawing Sheets

SYSTEM AND METHOD FOR PRINTING FROM A WEB APPLICATION

BACKGROUND OF THE INVENTION

The present invention generally relates to an improved method and system for printing from a web application. More specifically, it relates to an improved system and method for printing target data from a web application used through a browser of a client computer that is operatively connected to a web server providing the web application.

The use of web applications has been growing over the years as the Internet gets more sophisticated. Because most web applications are designed to work with cross-platform browsers, they operate independently from the operating system ("OS"). In other words, most web applications can work with any operating systems, such as LINUX®, WINDOWS®, or MACINTOSH®. As such, web applications are becoming an extremely powerful tool on the Internet. Currently, most web pages from the web application are printed through the functionality of the web browser, which, in turn, makes use of the underlying operating system. However, printing from browsers is known to frequently produce bad results. The printed documents typically match the display page on the browser, which is optimized for viewing rather than printing and often creates undesired results. Furthermore, as a result of numerous browsers that are currently being used, the printing of web pages varies greatly from browser to browser, resulting in inconsistent printing.

Consequently, there are current web applications that provide a means of generating printable data from the web applications themselves in an attempt to provide information optimized for printing to overcome the printing problems caused by the browser. Adobe Acrobat is a widely available web browser plug-in designed to read, display and print Portable Document Format ("PDF") files from within a web browser. As a result of being integrated into the browser, the user can preview the print output. However, there are still limitations. Although the plug-ins, such as Adobe Acrobat, give users previews of their print output, they do not provide a preview of the print output in the context of the peripheral devices and/or services. The print output displayed is simply a preview of the document with the formats that are set up in the document, which may look different when the features or limitation of the peripheral devices are added.

BRIEF SUMMARY OF THE INVENTION

The present invention is directed to an improved system and method for printing target data from a web application. More particularly, the system and method for printing target data from a web application used by a browser of a client computer that is operatively connected to a web server providing said web application.

The present invention provides a system that includes a client computer having a browser for using the web application, a web server for providing the web application, a web application content for providing the web application on the browser, and a print destination server specified by the user for printing the target data. The web application content further directs the browser to the print destination server responsive to user print selection.

The present invention also provides a method that includes the steps of sending a web application content by the web server to the browser responsive to a request for web content by the browser, sending an URL request for printing the target data responsive to user print selection on the web application content, directing the browser to a print destination server indicated by the URL request by the web application content, and printing the target data according with user specified print configuration by the print destination server.

The present invention further provides another method that includes the steps of sending a web application content by a web server to a browser responsive to a request for web content by the browser, sending a URL request for printing the target data to the web server responsive to user print selection on web application, constructing imaging data for the target data responsive to the URL request, storing the imaging data to a personal imaging repository, and printing the imaging data in accordance with a print configuration specified by the print destination server.

The present invention further provides another method that includes the steps of requesting to print the imaging data from the web application to a print destination server by the browser, transferring imaging data to a personal imaging repository by the web application responsive to the print request by the browser, and printing the imaging data by the print destination server. The personal imaging repository is an exchange infrastructure between the imaging data and available web services.

GLOSSARY OF TERMS AND ACRONYMS

Figure 1:
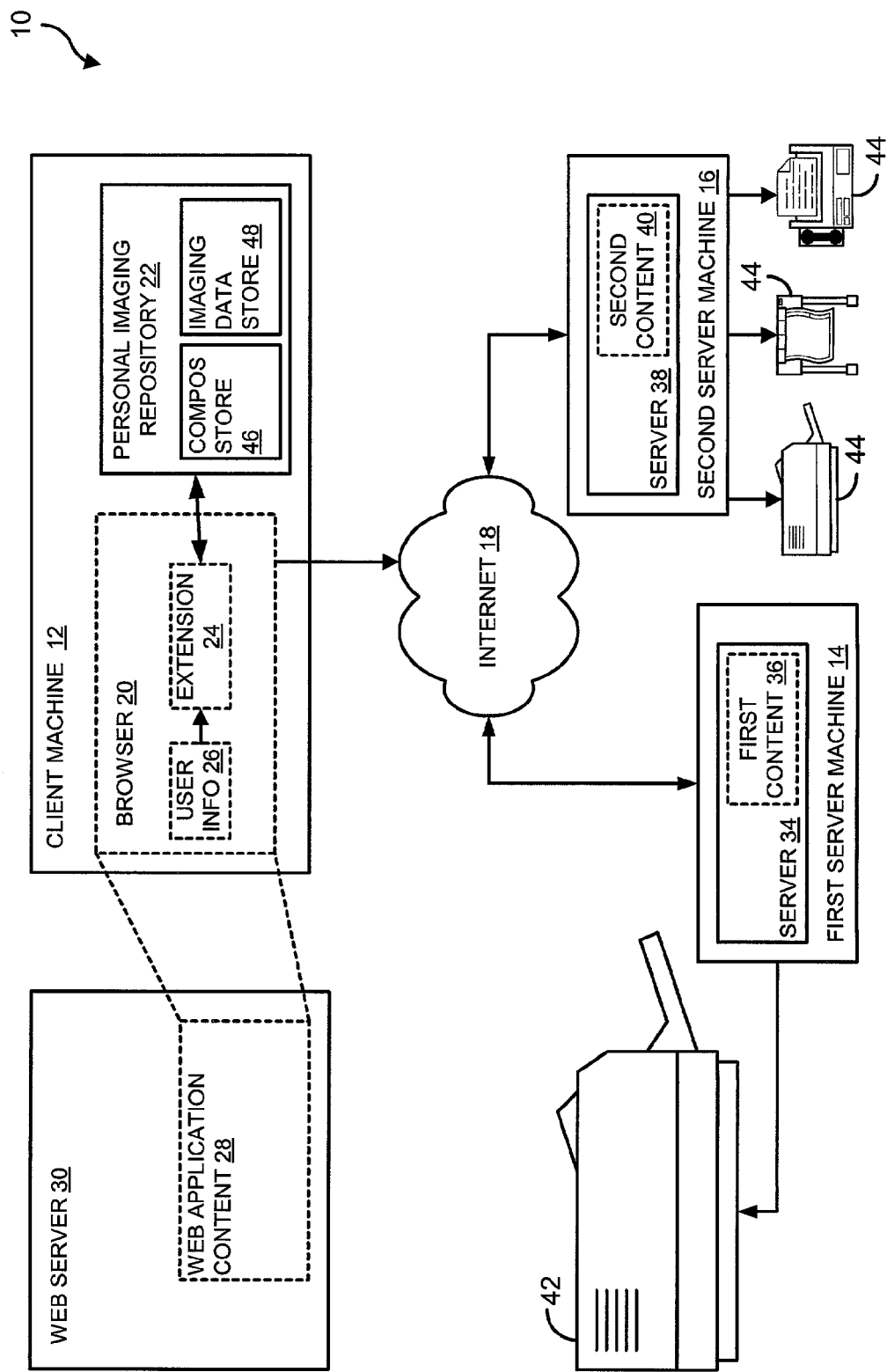
FIG. 1 is an architectural diagram of a client-server network system in which the present invention can be implemented.

The following terms and acronyms are used throughout the detailed description:

Client-Server. A model of interaction in a distributed system in which a program at one site sends a request to a program at another site and waits for a response. The requesting program is called the "client," and the program which responds to the request is called the "server." In the context of the World Wide Web (discussed below), the client is a "Web browser" (or simply "browser") which runs on the computer of a user; the program which responds to browser requests by serving Web pages, or other types of Web content, is commonly referred to as a "Web server."

Composition store. Composition store refers to a network service or a storage device for storing imaging composition(s) that can be accessed by the user or other web services.

Content. A set of executable instructions that is served by a server to a client and that is intended to be executed by the client so as to provide the client with certain functionality. Web content refers to content that is meant to be executed by operation of a Web browser. Web content, therefore, may non-exhaustively include one or more of the following: HTML code, SGML code, XML code, XSL code, CSS code, Java applet, JavaScript and C-"Sharp" code.

Exchange infrastructure. An exchange infrastructure is a collection of services distributed throughout a network that stores imaging data associated with a particular user through a user profile.

Hyperlink. A navigational link from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Imaging composition. An imaging composition comprises links to imaging data serviced as a single unit.

Imaging data. Imaging data refers to digital data capable of being represented as two dimensional graphics, such as a Portable Document Format ("PDF") file or a Joint Photographic Experts Group ("JPEG") file.

Imaging data store. Imaging data store refers to a network service or a storage device for storing imaging data that can be accessed by the user or other network services. The imaging data store preferably accepts the imaging data in multiple standard file formats, and the imaging data is converted into these file formats when necessary depending on the implementation.

Internet. A collection of interconnected or disconnected networks (public and/or private) that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

World Wide Web ("Web"). Used herein to refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, for example, a Web site may have the ability to print documents, scan documents, etc.

HTML (HyperText Markup Language). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages which can be sent from the client to the server to request different types of server actions. For example, a "GET" message, which has the format GET <URL>, causes the server to return the document or file located at the specified URL.

URL (Uniform Resource Locator). A unique address which fully specifies the location of a file or other resource on the Internet or a network. The general format of a URL is protocol: //machine address:port/path/filename.

User Information. User information is identification and security information used in accessing imaging composition (s) and imaging data associated with a particular user profile. It is preferably accessed either directly or indirectly through methods provided by an extension component integrated into the web browser.

PDA (Personal Digital Assistant). A small hand-held computer used to write notes, track appointments, manage email and browse the web, generally with far less storage capacity than a desktop computer.

Personal imaging repository. A personal imaging repository is a conceptual term describing the exchange infrastructure used to exchange imaging composition and imaging data with web services. Users are associated with their imaging data through user profiles.

DETAILED DESCRIPTION

Broadly stated, the present invention is directed to an improved system and method for printing from a web application. The system and method provide printing from a web application that is independent of the configuration of the operating system. In addition, since the print destination server can return with specific print content that relates to a selected device, the present invention allows a preview of the print job in the context of the devices and/or services offered by the print destination server.

The client-server network system in which the present invention can be implemented is shown in FIG. 1 and indicated generally at 10. A client machine 12 is connected to a first server machine 14 and a second server machine 16 via the Internet 18. The client machine 12 includes a browser 20 and, preferably, a personal imaging repository 22. The browser 20 further includes an extension component (extension) 24 for accessing user information 26, which provides an interface between content executing in the browser 20 and the personal imaging repository 22. More specifically, the user information 26 is used for associating user profiles to their own personal imaging repository. It should be noted that the user profile can associate different users or groups to the personal imaging repository. For example, the user profile can associate a single user to a particular personal imaging repository, but, at the same time, this user can also have multiple user profiles, resulting in multiple personal imaging repositories associated to a single user. Alternatively, the user profile can associate a group having multiple users to a particular personal imaging repository. The personal imaging repository, in this scenario, can be used by a group having a common association, such as a group project. As described, the user profile can be defined with great discretion and flexibility, and these other implementations are contemplated and within the scope of the present invention.

The browser uses a web application content 28 that is provided by a web server 30. When the user selects print in the web application content, the web server 30, among other things, directs the browser 20 to the print destination. Although one client machine 12 and two server machines 14, 16 are shown as examples, the preferred implementation would likely involve many server machines to which the client machine has access and can communicate. For better readability, "a" client machine or server machine will be sometimes referred to. However, it should be understood that the use of "a" also refers to "one or more".

The first server machine 14 includes a first server 34. When the browser 20 is directed to the first server 34 indicated by a Uniform Resource Locator ("URL"), a first content 36 is served by the first server to the browser 20. Each content 36 is preconfigured with specific instructions depending on the type of service the server machine provides. Similarly, the second server machine 16 includes a second server 38 with a second content 40. Generally, the contents 36, 40 are likely different, because the services and/or access to devices provided by the servers are different. In this example, the first server machine 14 is connected to a single printing device 42, whereas the second server machine serves multiple printing devices 44. Consequently, the first content 36 and second content 40 will be very different, each including separate instructions to the browser 20.

Although it is shown that the servers only represent printing devices in this example, the server can provide other services. For example, the server can be an auction web site, such as ebay.com, which makes an auction page for the user when a graphic file is printed to the web site. As one can see, the type of services and/or devices the servers can offer is limitless. In the present invention, the user can "print" to any one of services. As a result, the use of the word "print" is intended to be given a very broad definition, which can be used with many available devices or services. Whatever the services and/or device the servers provide, the content can include the instructions needed for the configuration. Given the wide usage of the present invention, it is preferred that a personal imaging repository 22 be implemented with the present invention, which stores data that can be accessed by these servers.

In the preferred embodiment, the personal imaging repository 22 includes a composition store 46 for storing imaging composition(s) of the imaging data that are serviced as a single unit and an imaging data store 48, i.e., digital memory, for storing the imaging data. An imaging composition preferably comprises links to the imaging data, which can be located at another service. As a result, the composition store 46 stores only the imaging compositions. The imaging data store 48, on the other hand, is any imaging data store located on any computer that contains the imaging data. More specifically, each web service can have its own imaging data store 48 available to the public.

For example, at some earlier time, a user may print an article from a web service site, resulting in an imaging composition being created and stored in the user's composition store 46. The imaging composition contains only the link to the imaging data for this article stored on the web service site 36. Consequently, the imaging data for the article is not in the imaging data store 48 located on the client machine 12. Rather, the imaging data is stored in the imaging data store 48 located on the web service site. Of course, users will have an imaging data store 48 that belongs to their user identification where they can store imaging data, which is the imaging data store shown in the client machine 12. As a result, the term "personal imaging repository" 22 is meant as a conceptual term for an exchange infrastructure between the imaging data and the available web services on the Internet. Similarly, the term "web" denotes millions of distinct servers that comprise the web. However, the web does not actually do anything itself. In the present invention, the servers serving the composition store 46 and the imaging data store 48 are physical implementations of the personal imaging repository as a concept.

It should be noted that the personal imaging repository 22 can represent any type of data storage device. In fact, the data storage device 22 does not necessarily have to be located with the client machine 12. The personal imaging repository 22 can be located, for example, on another machine, which the client machine can access through the Internet. Although it is preferred currently to include the personal imaging repository 22 with the client machine 12, this would likely change as the bandwidth becomes faster and the popularity of the personal digital assistant ("PDA") increases. These alternative implementations should be considered to be within the scope of the present invention. One preferred embodiment that is more tailored to faster bandwidth or any client machine with limited storage capacity is shown in FIG. 2.

Figure 2:
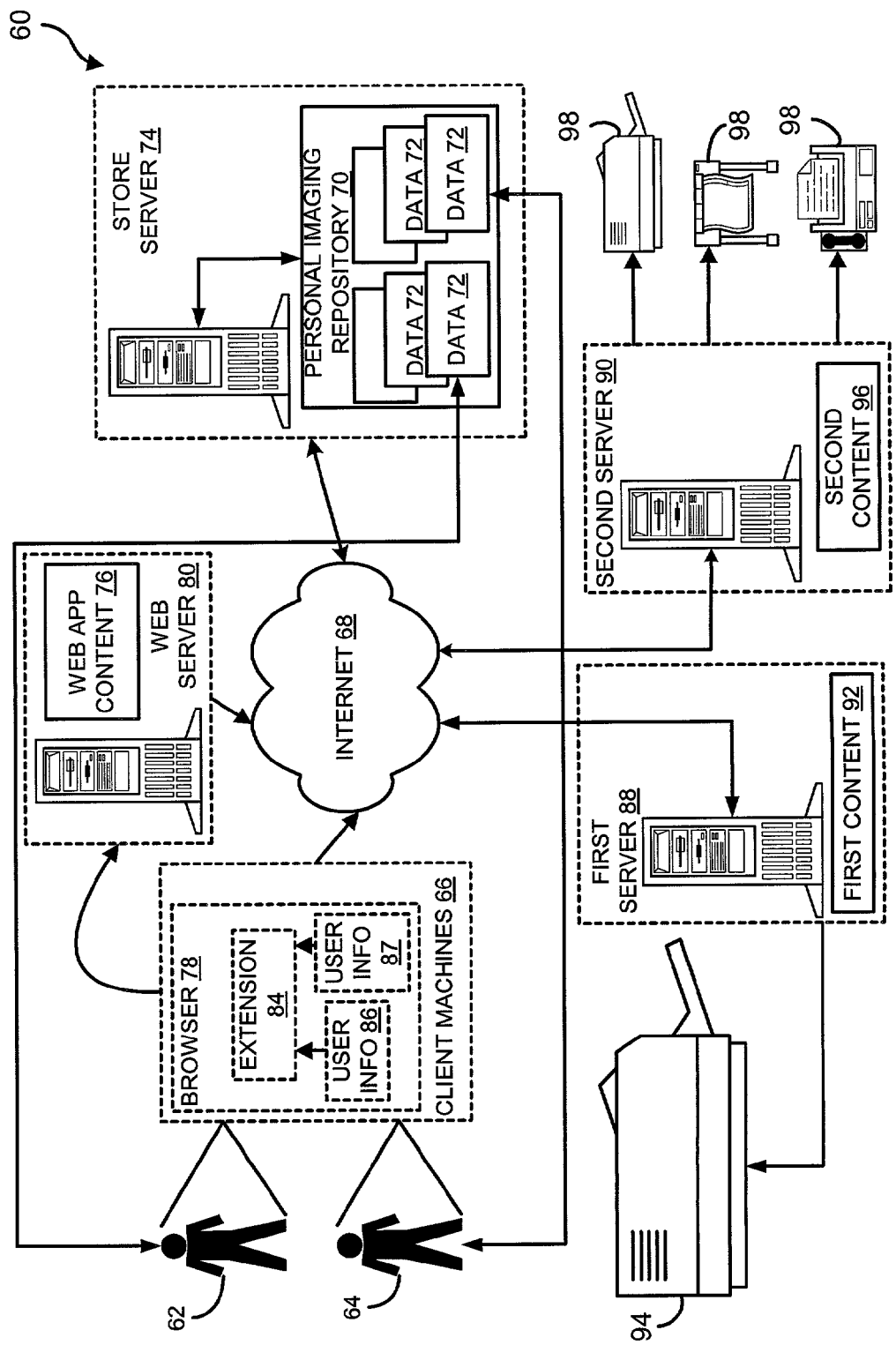
FIG. 2 is an architectural diagram of a second client-server network system in which the present invention can be implemented.

A second client-server network system is shown in FIG. 2, and indicated generally at 60. In this implementation, multiple users 62, 64 can utilize the same client machines 66 through the Internet 68. In this implementation, the client machines 66 can include client computers that have less storage memory, such as a Personal Digital Assistant ("PDA") or a laptop. Because of the limit on the storage memory, the personal imaging repository 70 for storing user's data 72 is located on a second computer 74, which can also be a server computer or just a linked client machine 66. In this example, the second computer 74 is a server, which will be herein referred to as a store server to distinguish it from the servers for printing. Users 62, 64 are assigned different user profiles for accessing the personal imaging repository 70 through the store server 74. Although not shown, the personal imaging repository 70 can similarly be implemented with a composition store and an imaging data store, where the data 72 can be stored.

Preferably, a first user 62 initially accesses the system 60 with a login name and password. Once the first user 62 has access to the system 60, the first user then also has access to the personal imaging repository 70 that is linked to this first user's login name. Similarly, if a second user 64 logs in with a login name and password, the second user has access to the system 60, including the personal imaging repository 70 that belongs to this second user's login name. In this implementation, users can access the system 60 and their personal imaging repository 70 from any computers that have a browser and Internet access. As a result of the flexibility of the Internet, it is possible for users to access the system 60 and their personal imaging repository 70 using a standard PDA and/or wireless web phone.

A web application content 76 can be used by the users through a browser 78 that is located on the client machine 66. Similar to the previous implementation, the web application content 76 is provided through a web server 80. The browser 78 also contains an extension 84 for accessing the user information 86, 87 that associate the different user profiles assigned to the users 62, 64 to the personal imaging repository. As shown, each user profile has its own user information. Alternatively, the user information can also contain information for both of the user profiles. These other variations are contemplated and are within the scope of the present invention.

Users can access a variety of servers on the Internet for the printing of the target data from the web application content 76. In this example, there is a first server 88 and a second server 90. The first server 88 provides a first print content 92 representing a single printing device 94, and the second server 90 provides a second print content 96 representing a plurality of printing devices 98.

Figure 3:
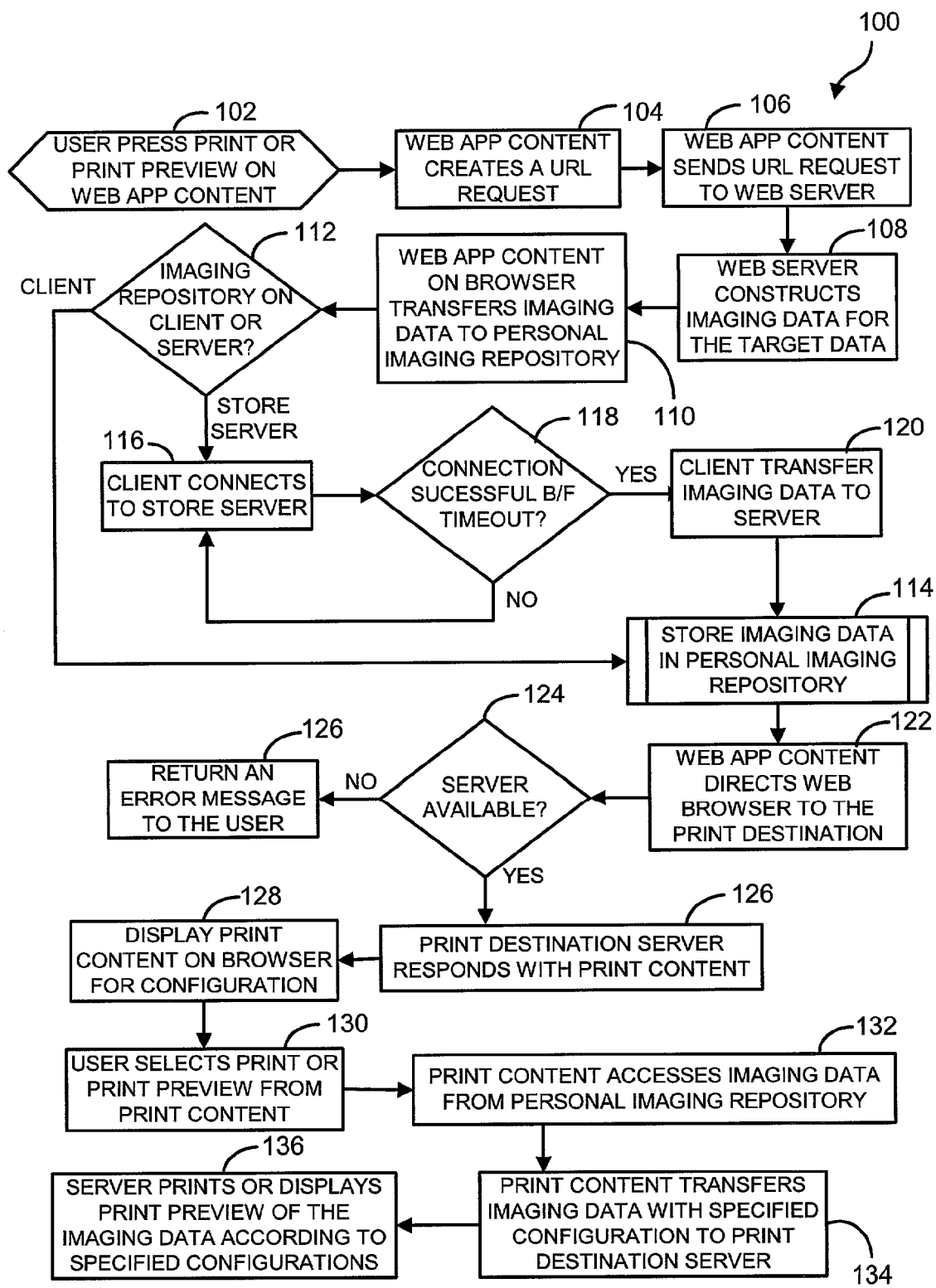
FIG. 3 is a flow chart illustrating the preferred functionality of the print method of the present invention.
Figure 5:
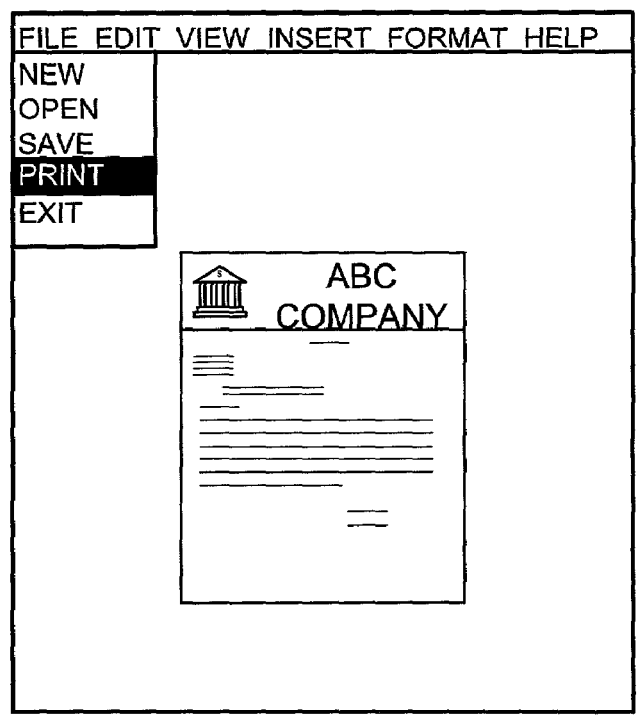
FIG. 5 illustrates an exemplary page of the target data for printing from the web application.

Turning to an important aspect of the present invention, a flow chart of the preferred functionality of the print method is shown in FIG. 3, and indicated generally at 100. Upon the user selecting PRINT or PRINT PREVIEW on the web application content (block 102), the web application content first creates a URL request (block 104), which is sent to the web server (block 106). Shown as an example in FIG. 5, a user creates a document using the web application, and, from the web application, the users can select to PRINT the document (i.e., the target data) to a specific URL (i.e., the print destination).

In response to the URL request, the web server constructs an imaging data of the target data (block 108). However, the step of constructing the imaging data can also be done by other components, such as the web application content. The implementations of performing these steps are meant to be flexible depending on the chosen configuration of network system. These alternative implementations are contemplated and are within the scope of the present invention.

An imaging data generally refers to digital data capable of being represented as two dimensional graphics of the target data, which might not look the same as the target data depending on the behavior of the web application. This step of constructing an imaging data may not be necessary, and this depends on the implementation and configuration of the print destination. For example, if you are sending a graphic file to the earlier example of an auction site for making an auction page with the graphic file, an imaging data might not have to be generated in this case. Instead, the print destination server would take the target data without further modification for compatibility. However, since it is hard to foresee what type of graphic files the web site will accept, the preferred method is implemented with this step of constructing imaging data to guarantee uniformity and compatibility. The preferred format for the imaging data is preferably JPEG, Graphics Interchange Format ("GIF"), Portable Network Graphics Format, Tagged Image File Format ("TIFF"), PDF and Microsoft Windows bitmap format ("BMP").

After the web server constructs the imaging data for the target data (block 108), the web application content transfers the imaging data to the personal imaging repository (block 110). It is then determined whether the personal imaging repository is located on the client computer or the store server (block 112). If the personal imaging repository is located on the client (block 112), the imaging data is saved to the repository without further connection (block 114). If, however, the repository is located on the store server (block 112), the client machine will connect to the store server (block 116). It is then determined whether the connection is successful before the timeout (block 118), and the client machine will keep trying to connect to the store server until a timeout or connection is successful (block 116). Once the connection with the store server is successful (block 118), the client transfers the imaging data to the store server (block 120) for storage in the personal imaging repository (block 114).

After the imaging data is stored in the personal imaging repository (block 114), the web application content directs the browser to the server indicated by the print destination (block 122), which will be referred to as the print destination server. It is next determined whether the print destination server is available for printing (block 124). An error message is sent to the user (block 126) if the print destination server is not available (block 124). If, on the other hand, the print destination server is available (block 124), it will respond to the browser by returning a print content (block 126), which will be displayed on the browser for user configuration (block 128). The print content is generally a web page that is designed according to the services that this print destination provides. Furthermore, there are a number of ways to implement the print content depending on the services available. For example, the print content can be configured to display a list of imaging data stored the personal imaging repository. In this scenario, the print content will access the personal imaging repository to obtain the list for display to the user. These other variations are contemplated and should be considered within the scope of the present invention.

Figure 6:
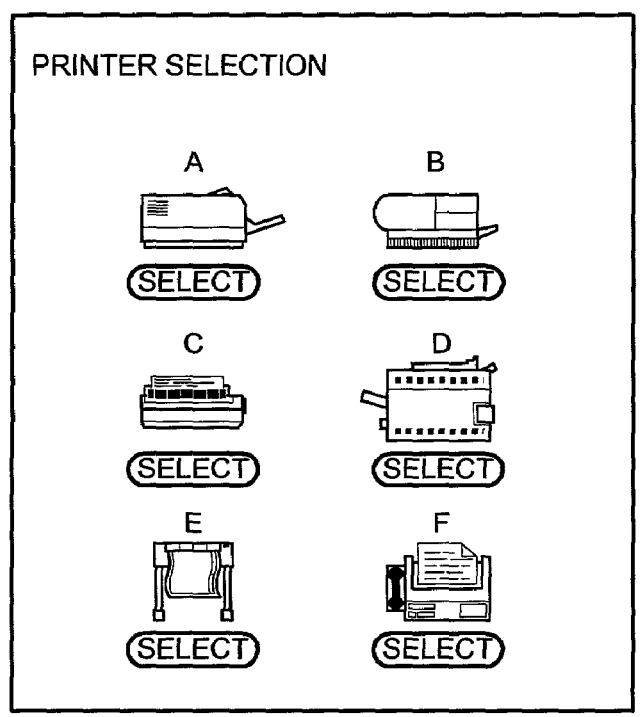
FIG. 6 illustrates an exemplary page of the print content from the print destination server.
Figure 7:
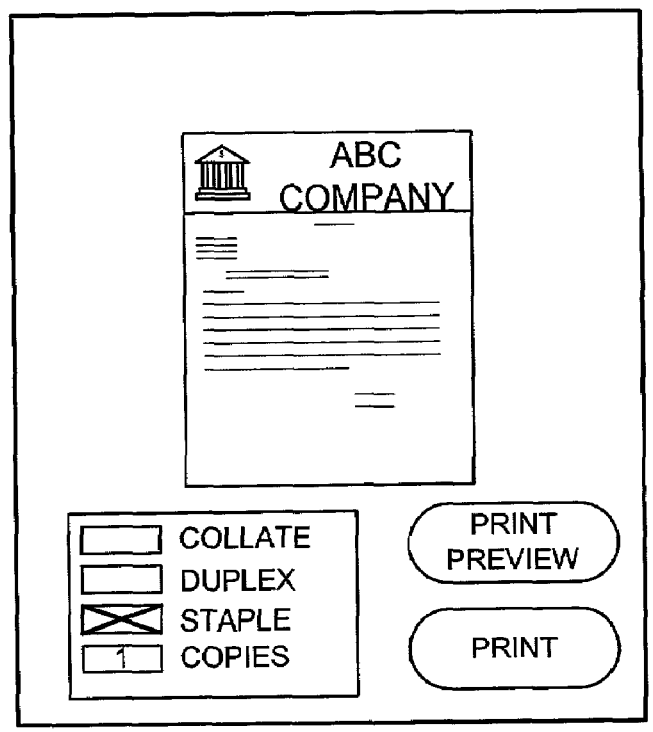
FIG. 7 illustrates an exemplary page of the print content from the print destination server; and, FIG. 8 illustrates an exemplary status page of the print content from the print destination server.

As an example, if the print destination server provides multiple printing devices, a page of the print content may contain all the printing devices that are available for user selection (shown in FIG. 6). From this page of the print content, the user selects a printing device, another page will be returned to the user with the imaging data and the configurations that are available for this particular printing device (shown in FIG. 7). Through the print content, the user is able to print or print preview the imaging data according to the configurations of the printing devices (shown in FIG. 7). In the auction site example, the users can preview the auction page that they configured before posting onto the auction list. As shown, the print content can be returned with multiple pages depending on the need of the services provided by the print destination server.

Figure 8:
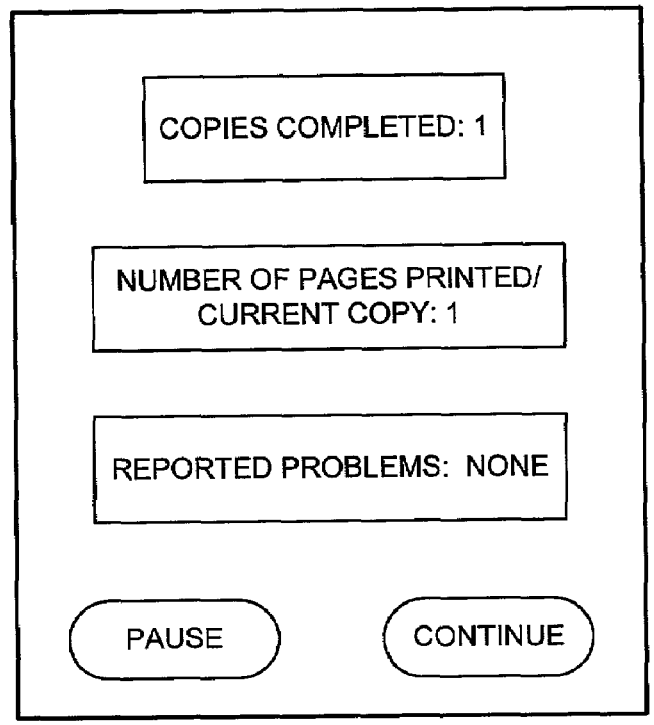

Once the user configuration is finalized, the user can then select to PRINT or PRINT PREVIEW from the print content (block 130). The print content accesses the imaging data from the personal imaging repository (block 132), and transfers the imaging data with the specified user configuration to the print destination server (block 134), in which the imaging data is printed or displayed according to the specified configurations including the selected printing device (block 136). At the end, the print content can return a status page to indicate successful output to the printing device (shown in FIG. 8).

Figure 4:
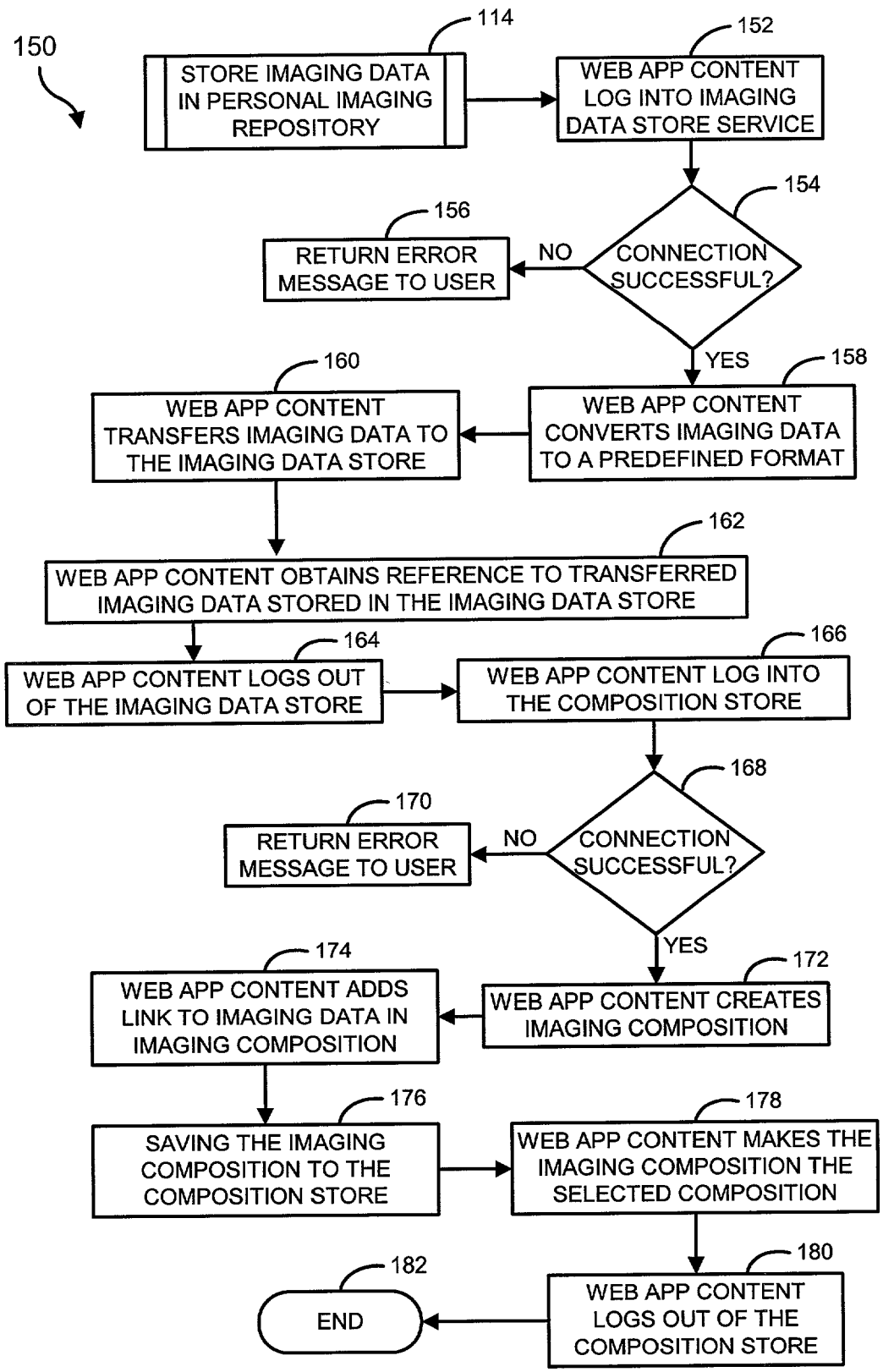
FIG. 4 is a flow chart illustrating the preferred functionality of the transfer method of the present invention.

The preferred functionality of the store method is shown in FIG. 4, and indicated generally 150. The store method is initiated by the step of storing imaging data in the personal imaging repository (block 114) first shown in FIG. 3. The web application content first logs into the imaging data store service (block 152). At this point, it is determined whether the connection to the imaging data store is successful (block 154), and if not, an error message is sent to the user (block 156). Once it is established that a connection to the imaging data store is successful (block 154), the web application content preferably converts the imaging data into a predefined format, such as JPEG, (block 158). It is preferred that a predefined format and a conversion step for the predefined format are included, however, the present invention can also be implemented without the predefined format. In fact, the implementation of the personal imaging repository is not limited to the composition store and the imaging data store. There are numerous ways to implement the personal imaging repository. As a result, the transfer method can be implemented in various ways depending on the physical implementation of the personal imaging repository, and these various methods are within the scope of the present invention.

After the imaging data is in the predefined format (block 158), it is transferred to the imaging data store by the web application content (block 160). The web application content next obtains a reference to the transferred imaging data stored in the imaging data store (block 162), and logs out of the imaging data store (block 164) and log into the composition store (block 166). It is then determined whether the connection to the composition store is successful (block 168). An error message is sent to the user (block 170) if the connection was unsuccessful (block 168). After a successful connection to the composition store (block 168), the web application content creates an imaging composition (block 172) and adds the reference to the imaging data stored in the imaging data store obtained earlier in the imaging composition (block 174). This newly created imaging composition is then saved to the composition store (block 176), and makes the imaging composition the selected composition in the composition store (block 178). Because the imaging composition is set as the selected composition, it will be used by web services that make use of the selected composition of the personal imaging repository. Finally, the web application content logs out of the composition store (block 180), which brings the method to an end (block 182).

It should be noted that the order of the methods can be varied and changed depending on the implementation of the present invention. An alternative method is logging into either one of the stores, and upon successful connection, the requested web service then immediately logs into the other store prior to performing any further steps. More specifically, for example, the requested web service can first log into the imaging data store. Upon a successful connection with the imaging data store, the requested web service next logs into the composition store. Once it is established that the requested web service has successfully logged into both the imaging data store and the composition store, only then would the remaining steps be processed. This alternative method ensures that the imaging data is not unnecessarily transferred to the imaging data store when an imaging composition of the transferred imaging data can not be added to the composition store due to a connection failure. This method is especially preferred when the composition store resides on a separate location other than the imaging client as shown in FIG. 2.

From the foregoing description, it should be understood that an improved system and method for printing target data from a web application has been shown and described, which has many desirable attributes and advantages. The system and method provides printing from a web application that is independent of the configuration of the browser. Furthermore, because the print destination server can return with specific print content that relates to a selected device or services, the present invention allows a preview of the print job in the context of the devices and/or services offered by the print destination server. This is extremely helpful, since the print content can be designed in such a way that the services offered by the print destination server are also independent of the operating system, which allows for greater flexibility with fewer limitations.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A system for printing from a web application, comprising:
a web application providing web application content on a browser of a client computer;
a personal imaging repository for storing imaging data for a user profile, the personal imaging repository including an imaging data store and a composition store for the user profile; and
a print destination server for printing target data from the web application,
wherein upon a user selection to print target data from the web application, the web application content constructs imaging data for the target data, the web application content transfers the imaging data to the imaging data store of the personal imaging repository for the user profile, the web application content adds a link reference for the imaging data to the composition store of the personal imaging repository for the user profile, the web application content directs the browser to the print destination server, and the print destination server prints the imaging data.

2. The system as defined in claim 1 wherein the web application content creates and sends a URL request for printing of the target data from the web application responsive to the user print selection.

3. The system as defined in claim 1 wherein said imaging data is digital data of the target data that is capable of being represented as two dimensional graphics.

4. The system as defined in claim 1 wherein said imaging data store and said composition store of said personal imaging repository are located on said client computer.

5. The system as defined in claim 1 wherein said imaging data store and said composition store of said personal imaging repository are located on a store server.

6. The system as defined in claim 1 wherein said personal imaging repository is an exchange infrastructure between the imaging data and available web services.

7. The system as defined in claim 1 wherein said imaging data store is assigned to the user profile for storing imaging data.

8. The system as defined in claim 1 wherein said composition store provides for storing imaging compositions of the imaging data that are serviced as a single unit.

9. The system as defined in claim 8 wherein each imaging composition comprises a link reference for each imaging data that is serviced as a single unit.

10. The system as defined in claim 1 wherein said print destination server is indicated by a Uniform Resource Locator in said request.

11. The system as defined in claim 1 wherein said print destination server sends print content to said browser in response to said browser being directed to said print destination server.

12. The system as defined in claim 11 wherein said print content provides for specifying user configuration of printing on said print destination server.

13. The system as defined in claim 12 wherein said print content transfers said imaging data with a user specified print configuration to said print destination server for printing.

14. A method for printing from a web application, comprising:
sending web application content of the web application to a browser of a client computer in response to a request for the web application content by the browser;
in response to a user print selection for printing of target data from the web application, constructing imaging data for the target data and storing the imaging data in a personal imaging repository of a user, including connecting with an imaging data store of the personal imaging repository and transferring the imaging data to the imaging data store;
creating an imaging composition having a link reference to the imaging data stored in the imaging data store and saving the imaging composition to a composition store of the personal imaging repository;
directing the browser to a print destination server selected for printing of target data from the web application; and
printing the imaging data by the print destination server according to a user specified print configuration.

15. The method according to claim 14 further comprising:
creating and sending a URL request for printing of the target data from the web application in response to the user print selection of the web application content.

16. The method according to claim 14 wherein prior to directing the browser, further comprising:
determining whether said print destination server is available; and
returning an error message when said print destination server is not available.

17. The method according to claim 14 wherein directing the browser further comprises:
returning print content to the browser for specifying a print configuration;
accessing the imaging data from the personal imaging repository; and
transferring the imaging data with a specified print configuration to said print destination server for printing.

18. The method according to claim 14 wherein prior to storing the imaging data, further comprising:
determining whether said personal imaging repository is located on said client computer or a store server;
connecting said client computer to said store server if said personal imaging repository is located on said store server;
determining whether the connection between said client computer and said store server is successful; and
transferring the imaging data from said client computer to said store server if the connection is successful.

19. The method according to claim 14 wherein said personal imaging repository is an exchange infrastructure between the imaging data and available web services.

20. The method according to claim 14 further comprising:
obtaining a link reference to the imaging data stored in the imaging data store of the personal imaging repository; and
disconnecting from the imaging data store.

21. The method according to claim 14 wherein connecting with the imaging data store further comprises:
determining whether the connection with the imaging data store is successful;
returning an error message when the connection is not successful; and,
converting the imaging data into a predefined format when the connection is successful.

22. The method according to claim 21 wherein said predefined format is any one from a group consisting of:
Joint Photographic Experts Group Format;
Graphics Interchange Format;
Portable Network Graphics Format;
Tagged Image File Format;
Portable Document Format; and,
Microsoft Windows bitmap format.

23. The method according to claim 14 further comprising:
setting the imaging composition as a selected composition available for access in the composition store; and,
disconnecting from the composition store of the personal imaging repository.

24. The method according to claim 14 wherein prior to creating an imaging composition, further comprising:
determining whether a connection with the composition store is successful; and,
returning an error message to the user when the connection to the composition store is not successful.

25. The method according to claim 14 wherein creating an imaging composition further comprises:
adding the link reference to the imaging data stored in the imaging data store to the imaging composition.

* * * * *